M. KARABIN, J. SKOCIOKH AND K. MANDL.
MAKING GLASS COLLAR BUTTONS.
APPLICATION FILED MAR. 13, 1920.

1,372,294.

Patented Mar. 22, 1921.

Inventors
Michael Karabin,
John Skociokh, and
Karl Mandl
By Louis M. Schmidt
Atty.

UNITED STATES PATENT OFFICE.

MICHAEL KARABIN, JOHN SKOCIOKH, AND KARL MANDL, OF NEW BRITAIN, CONNECTICUT.

MAKING GLASS COLLAR-BUTTONS.

1,372,294.　　　　　Specification of Letters Patent.　　Patented Mar. 22, 1921.

Application filed March 13, 1920. Serial No. 365,653.

*To all whom it may concern:*

Be it known that we, MICHAEL KARABIN, JOHN SKOCIOKH, and KARL MANDL, said KARABIN and SKOCIOKH being citizens of Austria, and said MANDL being a citizen of the United States, residing at New Britain, in the county of Hartford and State of Connecticut, have invented certain new and useful Improvements in Making Glass Collar-Buttons, of which the following is a specification.

Our invention relates to improvements in making glass collar buttons, and the object of our improvement is to produce a collar button that is attractive and sanitary and by means that are simple and efficient.

In the accompanying drawing:—

Figure 5:
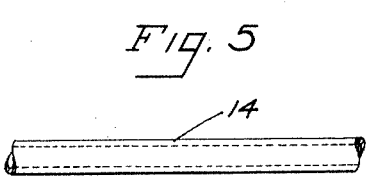
Fig. 5 is a side elevation of a piece of stock, of tubular form, that is used for forming the body portion of our collar-button, comprising the base and the shank, and as distinguished from the head.
Figure 6:
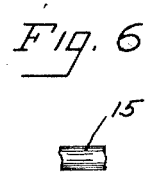
Fig. 6 is a side elevation of a globule or pellet of glass that is adapted for use for forming the head, being, as shown, of tubular form.

Our improved collar-button comprises a body 10 that is composed of the base 11 and the shank 12 and a head 13, the shank 12 being of reduced form and serving to connect the head 13 at one end and the base 11 at the other end, and is made of two pieces of glass, comprising the piece 14 shown in Fig. 5, that is used to form the body 10, and the piece 15, shown in Fig. 6, that is used to form the head 13.

The piece 14, shown in Fig. 5, that provides the stock for the body 10, is of tubular form and the body 10 is formed from one end thereof.

The piece 15, shown in Fig. 6, is provided in one piece of the right size for forming the head 13.

Figure 7:
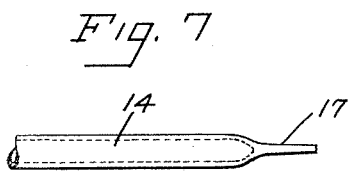
Fig. 7 is a side elevation of the stock shown in Fig. 5 after the first stage or operation in the formation of the body, being the first operation involved in forming the base, and involving drawing outwardly and reducing one end.
Figure 8:
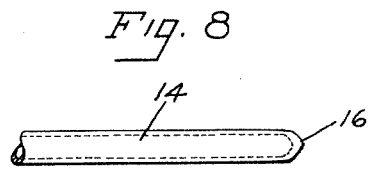
Fig. 8 is a side elevation showing the said end closed.
Figure 9:
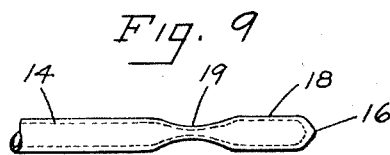
Fig. 9 is a side elevation showing another reduction of the tube adjacent the end and separating from the main tube a portion, generally of tubular form, that represents the material for the base.

The first result desired is to have the end of the tube 14 closed, as shown at 16 in Fig. 8, and this is obtained by drawing out the end of the tube so as to reduce the end portion as shown at 17 in Fig. 7, and then sealing off the said reduced portion 17.

The next step is to separate a portion 18 of the tube 14 from the tube stock by a reduced connecting neck 19 of tubular form, the end of which is closed at 16, as described.

Figure 10:
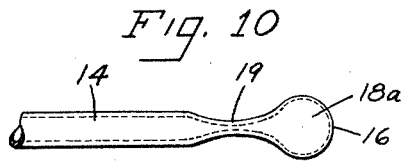
Fig. 10 is a side elevation of the same after being blown to a globular or ball form.
Figure 11:
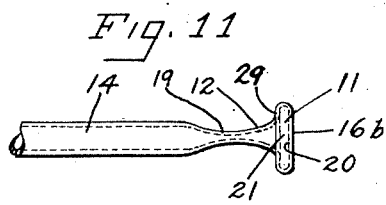
Fig. 11 is a side elevation of the same after the ball structure shown in Fig. 10 has been flattened to form the finished base.

Next the tube portion 18 is heated and blown to the ball or globular form, 18$^a$ as shown in Fig. 10, after which heat is again applied to the ball 18$^a$ and while in the softened condition, suitable for being manipulated, is operated upon for the formation of the base 11 by applying the closed end portion 16 to a flat surface.

The form obtained for the head 11 by the operation described is generally of disk form, having a flat bottom 16$^b$ for the outer face, and the inner face portion 29 being approximately flat for the outer and major portion and merging at the middle with the shank 12, and having the wall structure 20 relatively thin and inclosing an open or hollow interior space 21.

Thus the body 10 is formed of one piece of glass and is a hollow structure, with a relatively light or thin wall 20.

Figure 12:
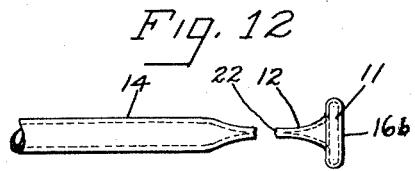
Fig. 12 is a side elevation of the same after being divided, so as to separate from the stock tube the body, comprising the base and shank.
Figure 13:
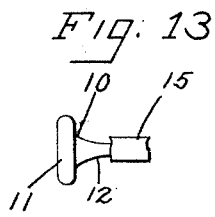
Fig. 13 is a side elevation of the body with the pellet shown in Fig. 6 applied to the shank for use in forming the head.

In the next operation, as shown in Fig. 12, the shank 12 is separated from the stock tube 14; the end 22 of the shank 12 being closed, after which the head pellet 15 is secured to the said end 22 of the shank 12, as shown in Fig. 13.

Figure 1:
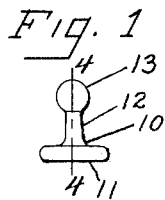
Figure 1 is a side elevation of our improved collar-button of glass for use as a front collar-button.

The finished head shown in Fig. 1 is obtained from the structure shown in Fig. 13 by heating the pellet 15 and manipulating while in the molten state.

No other operation is required for forming a head of substantially the form shown in Fig. 1, and this form is adapted for use in the finished article.

Figure 2:
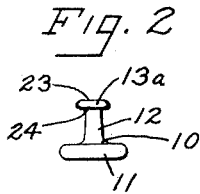
Fig. 2 is a side elevation of the form adapted for use as a back collar-button.
Figure 3:
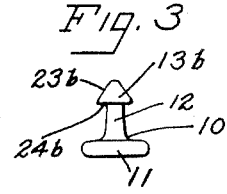
Fig. 3 is a side elevation of another form that is adapted for use as a front collar-button, having a novel form for the head, of generally conical form, with a flat base portion, as distinguished from the round form for the head as shown in Fig. 1.
Figure 4:
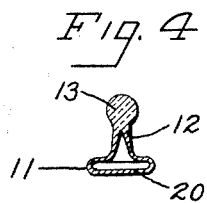
Fig. 4 is a sectional view on the line 4—4 of Fig. 1.

In case a special form is desired, such as the forms shown in Figs. 2 and 3, another operation is required after forming a head substantially like that shown in Fig. 1, and which involves, for the forms mentioned, heating the head 13 and applying to the end face portion of the said head 13 a tool of suitable form.

Thus for forming the head 13ª shown in Fig. 2 the special tool comprises merely a flat piece, such as used to form the base 11, the result being that the head 13ª is generally in the form of a disk of substantially flat form, the head structure differing from the base 11 in all cases in the detail of being solid instead of hollow, the outer face 23 being substantially flat, and the opposite, inner face portion 24 that borders the shank 12 is also substantially flat.

The flat effect for the said inner face portion 24 is obtained without the direct application of a tool to this particular part, the application of a tool to the outer face 23 with pressure operating to produce a suitable shape for the inner face 24 for use as a holding surface, of substantially flat, annular form.

Figure 14:
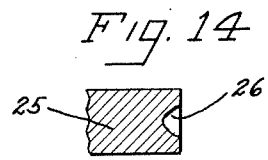
Fig. 14 is a sectional view of the tool that is used for forming the special head that is shown on the collar-button shown in Fig. 3.

The special, conical head 13ᵇ shown in Fig. 3 has a flat inner face 24ᵇ, generally like the inner face 24 shown in Fig. 2, and obtained in a similar manner, by the application of a tool under pressure to shape the outer face 13ᵇ, and the said tool 25, shown in Fig. 14, has a cavity 26 that is of the particular form desired for the shape of the outer face portion 23ᵇ, being conical, as mentioned, in the particular form shown.

The temperature required for making the devices shown and described is such as to permit of shaping and forming, being a low red temperature, and below the strictly melting temperature, and the finished article is substantially in the annealed condition, and does not require separate annealing.

Being made of two pieces, one for the body and the other for the head, the structure may be made up of two different colors for these parts. Generally plain glass would be used for the body. In the case of the head, however, a choice of colors is desirable, and is readily provided by using for the pellet shown in Fig. 6 the particular color desired.

We claim as our invention:—

1. The process of making glass collar-buttons comprising providing a tube for forming the body and a pellet for forming the head, forming the said body from the said tube in the form of a hollow structure having a base of disk-like form and a shank extending from one face of the said base, attaching the said pellet to the free end of the said shank, and manipulating the said pellet while heated to obtain a substantially ball-like form for the head.

2. The process of making glass collar-buttons as described in claim 1, and further operating on the said head by means of a tool applied to the free end face to effect a special shaping of the head portion.

MICHAEL KARABIN.
JOHN SKOCIOKH.
KARL MANDL.